United States Patent [19]

de Sartre et al.

[11] 4,228,493

[45] Oct. 14, 1980

[54] POWER CONTROL CIRCUIT AND A SWITCHING MODE POWER SUPPLY EMPLOYING THIS CIRCUIT

[75] Inventors: Jean de Sartre; Erich Geiger, both of Paris, France

[73] Assignee: Thomson-CSF, Paris, France

[21] Appl. No.: 972,058

[22] Filed: Dec. 21, 1978

[30] Foreign Application Priority Data

Dec. 29, 1977 [FR] France ................. 77 39611

[51] Int. Cl.³ ................................. H02M 3/335
[52] U.S. Cl. ................................. 363/56; 363/21; 363/80; 363/97; 363/147
[58] Field of Search ................. 363/20, 21, 56, 80, 363/97, 131, 147; 323/17

[56] References Cited

U.S. PATENT DOCUMENTS

| | | | |
|---|---|---|---|
| 3,916,281 | 10/1975 | Owen | 363/21 |
| 4,028,606 | 6/1977 | Beuchée et al. | 363/20 |
| 4,060,758 | 11/1977 | Wright | 323/17 |
| 4,079,295 | 3/1978 | den Hollander | 363/20 |
| 4,087,850 | 5/1978 | Koizumi | 363/21 |
| 4,104,714 | 8/1978 | Smith et al. | 363/80 |
| 4,146,832 | 3/1979 | McConnell | 323/17 |
| 4,156,273 | 5/1979 | Sato | 363/21 |
| 4,187,536 | 2/1980 | Govaert et al. | 363/21 |

FOREIGN PATENT DOCUMENTS

1454422 10/1966 France .
2246002 4/1975 France .
2285744 4/1975 France .

*Primary Examiner*—William H. Beha, Jr.
*Attorney, Agent, or Firm*—Cushman, Darby & Cushman

[57] ABSTRACT

A power control circuit for controlling the base current to a switching transistor connected in series with a primary winding of a switching transformer in which a logic circuit controls first and second amplifiers which respectively supply base current to and absorb base current from the switching transistor. The logic circuit blocks base current flow whenever the current flow through the transistor or a secondary winding of the transformer exceeds predetermined values in accordance with timing pulses.

9 Claims, 6 Drawing Figures

POWER CONTROL CIRCUIT AND A SWITCHING MODE POWER SUPPLY EMPLOYING THIS CIRCUIT

The present invention relates to an electronic circuit, for producing switching mode power supplies either for general use or for television receivers and line deflective generators combined with the chopper power supply in accordance with the WESSEL principle.

Presently-known control circuits usually comprise a certain number of functions related to the control and the regulation of the delivered current:
voltage reference
oscillator (synchronizable)
regulation amplifier
pulse duration modulator
protection, and progressive starting up,
but none has a stage of sufficient power to directly control the switching transistor. All these known circuits consequently require at their output an intermediate transistor, commonly termed a driver transistor, and a transformer for controlling the switching transistor. Such a transformer cannot deliver a correct base current which is both positive and negative, particularly when the cyclic ratio varies in a large proportion as in a chopper power supply. The behavior of the cut-off of the transistor is then a function of the duration of the positive current.

In the third place, the existing regulation circuits are never designed to automatically adapt themselves to the gain of the switching transistor and cannot take into account the storage time of the transistor to correctly delay the base negative current pulse irrespective of this storage time adapting itself automatically to the switching transistor employed.

The invention has many advantages, since the various data representing the state of the system are processed by a central logic which, in operating as a watching processor acquires and compares the data and delivers solely an output current only:
during the authorized intervals of time in accordance with the regulated current,
if the primary current has not reached the set limit,
if the load circuit does not operate under no load,
if the secondary current of the transformer is terminated,
if the switching transistor is correctly saturated.

More precisely, it concerns a power control circuit adapted to deliver the base control current $+I_B$ to a switching transistor, wherein its internal organization comprises, in the first place, a logic network for receiving analog data which represent the electric and magnetic state of the controlled device, this data being converted into logic data centralized in a central watching processor.

Among the advantages simultaneously possessed by the circuit of the invention there may be mentioned:
the direct dc coupling to the base of the switching transistor,
the automatic adaptation of the output current which is the base current $+I_B$ in accordance with the collector current $I_C$ in the switching transistor, irrespective of its gain, thereby reducing the power consumed in the base to the value which is just sufficient,
the negative base current amplitude $-I_B$ which "issues" from the base during the desaturation of the switching transistor, which is independent of the amplitude and duration of the positive base current $+I_B$ which "enters" the base during the control pulses,
the monitoring of the base current $+I_B$ so as to make the switching transistor operate at a constant saturation voltage ($V_{CE\,sat}$) between the emitter and collector,
the supervision of the saturation voltage of the switching transistor during the conduction time,
the control of the negative base current after the cut-off of the positive current with a delay depending on the storage time and determined by the moment when the collector upon desaturation reaches a given voltage,
the total protection of the switching transistor due to the watching logic processor which, at each instant, guarantees that the base current can only be interrupted after a minimum time.

The invention will be understood clearly from the following description with reference to the Figures in which.

Figure 1:
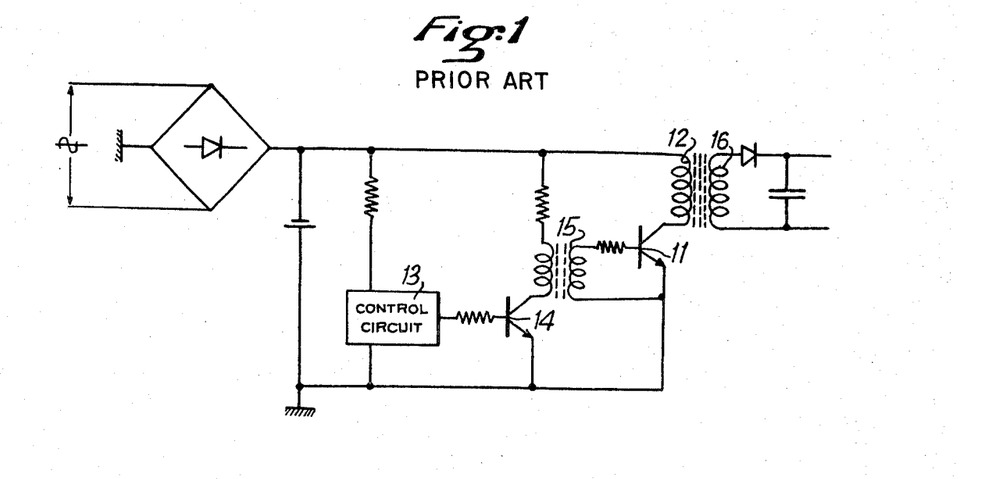
FIG. 1 represents the simplified diagram of a switching mode power supply according to the art.

FIG. 1 represents very diagrammatically a switching mode power supply according to the prior art. The rectified supply voltage supplies power, on one hand, to a switching power transistor 11 through the primary winding 12 of a transformer, and, on the other hand, to a control circuit 13. The current pulses issuing from the circuit 13 do not have sufficient intensity to be directly applied to the base of the switching transistor 11. This therefore requires an intermediate transistor or driver transistor 14 and a pulse transformer 15. When the base of the switching transistor 11 receives a pulse and renders it conductive, a current passes through the primary winding 12 of the transformer and consequently a current is produced in the secondary winding 16 to which the utilization load is connected. The necessity for two outside components, namely the driver transistor and the pulse transformer, presents serious drawbacks; compared to the control circuit which is very often integrated in a monolithic manner they are of large size, waste power, and employ out-of-date technology relative to integrated power circuits; furthermore the transformer cannot be automatically installed in production lines.

One of the advantages of the circuit of the invention is to integrate, at the output of the semi-conductor crystal, sufficient power to directly supply power to the base of the switching transistor 11 and in this way eliminate the driver transistor 14 and the transformer 15, the design of the output stage of the control circuit being such that it can deliver a current $+I_B$ up to $+4$ amps to render the switching transistor conductive and then absorb a current $-I_B$ up to $-4$ amps during the desaturation of this transistor.

Figure 2:
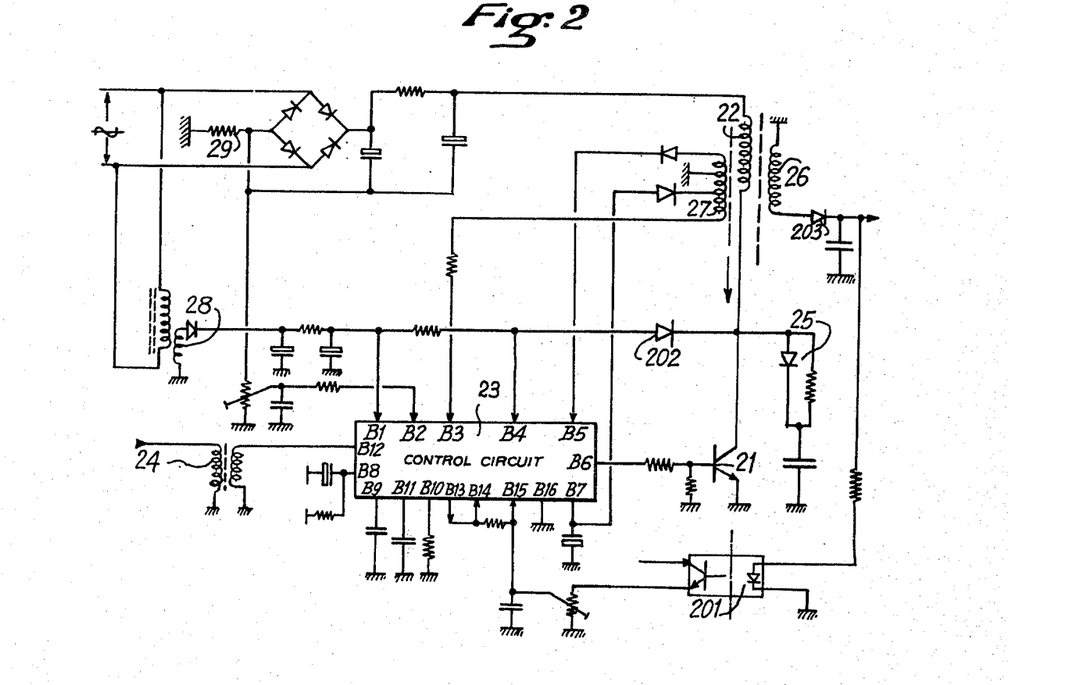
FIG. 2 represents the diagram of a switching mode power supply employing the circuit according to the invention.

FIG. 2 will facilitate the description of the circuit according to the invention by showing a diagram of application of this circuit to a switching mode supply model. Compared to FIG. 1, FIG. 2 shows that the control circuit 23 is directly connected to the base of the switching transistor 21 with no use of a driver transistor or pulse transformer. Of course, the utilization transformer remains and comprises, apart from the primary winding 22, a first load secondary winding 26 and a second secondary winding 27 which delivers to the control circuit 23, on one hand, the supply voltage $V_{CCB}$ of the power output stage and, on the other hand, information about the magnetic state of the transformer.

The small transformer 28 delivers to the control circuit 23 its supply voltage $V_{CC}$ which may be obtained by other methods and the isolation transformer 24 transmits to this circuit 23 the exterior synchronization pulses if the primary of the transformer must be separated from the mains supply. Owing to the large number of inputs and outputs of the control circuit 23, its terminal will be identified hereinafter by the conventional references B1 to B16.

Figure 3:
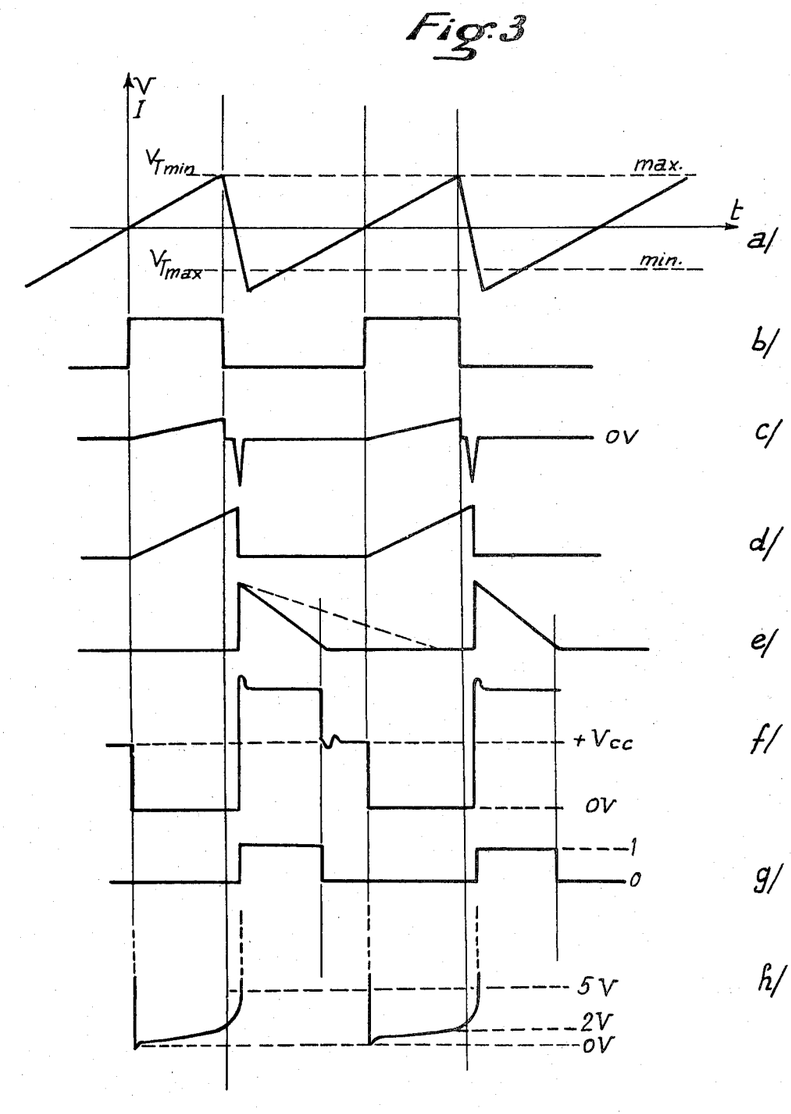
FIG. 3 represents the voltage or current waveforms observed in the course of the normal operation of the circuit of the invention.

FIG. 3 represents the various waveforms in various points of the application circuit: the time, plotted as abscissae, is to the same scale for all the graphs. The way in which the waveforms are generated will be explained subsequently, but the comparison of these voltage or current waveforms will permit a better understanding of the operation of the circuit.

The graph 3a represents the sawtooth voltage emitted by a generator which acts as a time base and which may by synchronized by an exterior signal transmitted by the transformer 24 of FIG. 2. The voltage of the sawtooth is compared, between a minimum level and a maximum level, with a voltage issuing from a regulation amplifier: there results during the intervals during which the voltage of the sawtooth increases, a control signal represented at 3b. This signal, when processed by the watching processor, gives rise, if no defect prevents it, to a base current $+I_B$ (FIG. 3c) of the switching transistor 21 (FIG. 2). There corresponds to the base current in this transistor a collector current $I_C$(FIG. 3d) which travels through the primary winding of the transformer 22 (FIG. 2) which produces, in the secondary winding 26 (FIG. 2), a secondary current (FIG. 3e). In FIG. 3f, the voltage at the collector of the switching transistor, which is equal to the saturation voltage of the latter when it is conductive, increases to about twice the supply voltage as soon as the transistor is blocked. When the base current has terminated, the saturation voltage of the collector progressively rises and permits the carriers blocked in the collector to be evacuated toward the base. When this voltage of the collector reaches 5.5 V, it may be considered that all these carriers are effectively evacuated (FIG. 3h). At this instant, a comparator delivers a logic signal which authorizes the deblocking of the negative base current and consequently accelerates the cut-off of the collector current which remained conductive up to this moment.

Subsequent to this moment the voltage of the collector continues to increase to about twice Vcc and the secondary current starts. The voltage of the collector remains at this value as long as the secondary current lasts, which is a sawtooth decreasing to zero. At this precise moment, the voltage of the collector redescends to +Vcc. The circuit is free and no longer has any current passing there through. This return of the collector voltage to +Vcc is employed for giving a logic information to the watching processor which blocks the output of $I_B$ so long as the logic level (FIG. 3g) has not returned to zero, which ensures that the secondary current is terminated and authorizes the start of a new cycle of $I_B$.

If for any reason the current of the secondary winding continued beyond the normal start of the following cycle (the case of an overcurrent or even of a short circuit of the load), the base current could only start again after the end of the secondary current, which reduces the time of the following cycle or may even eliminate one or more periods. When it receives authorization to start again, the base current is then synchronous with the oscillator.

Figure 4:
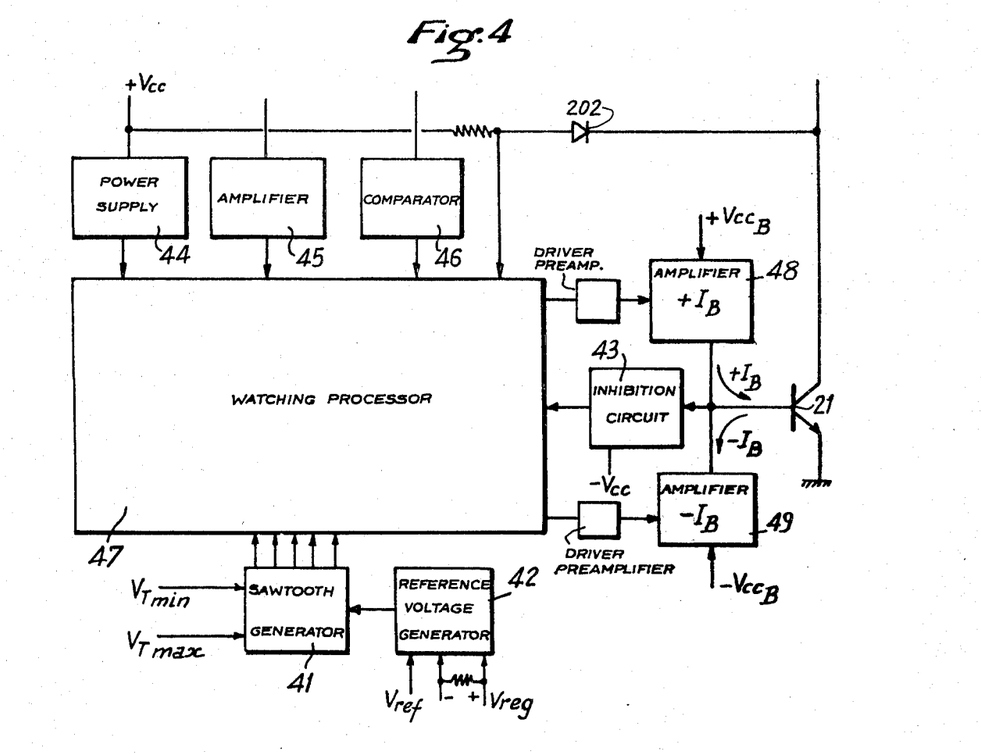
FIG. 4 represents a very simplified diagram of the control circuit according to the invention.

FIG. 4, which represents a very simplified diagram of the control circuit according to the invention in the form of operational blocks, permits locative the state data described in FIG. 3.

The watching processor 47 receives data generated or treated by various parts of the control circuit. In order to avoid ambiguity in respect to the term "circuit" there data generators will be conventionally designated hereinafter by the term "block". The data or items of information transmitted to the processor 47 come from;

the block 41 comprising the sawtooth generator with its synchronization system, the double width modulator in which are produced the rectangular pulses of variable width formed by the comparison between the sawtooth and the output voltage of the regulation amplifier (block 42), the return sawtooth pulse ensuring the end of the normal duration of the output signal for the base, the moving pulse of the minimum conduction time (Tmin) the pulse of maximum time (T max) and the logic signal +1 appearing in the case of the exceeding the level of comparison with the sawtooth. When the circuit of the secondary winding operates under no load(watching system):

the block 44, namely the circuit monitoring the supply voltage $+V_{CC}'$, the block 45 namely the threshold amplifier which monitors the emitter current of the switching transistor, identical to the overall current of the supply, or to the current in the primary winding 22 of the transformer;

block 46, namely the comparator which supervises the state of the transformer, more precisely the intensity of the current in the secondary winding 26.

The watching processor also receives, through a high tension diode 202 outside the circuit, information concerning the state of saturation of the collector of the switching transistor during the conduction.

At its outputs, the watching processor delivers control pulses to two driver preamplifiers which act on the two final stages 48 and 49, one of which supplies the positive current whereas the other absorbs the transitory negative base current of the switching transistor.

The data delivered to the watching processor will be analyzed separately, assuming that a voltage current or time value which is incorrect is processed by the supervising processor as a defect. In order to render the text more clear, the description of these data is given hereinafter in numbered paragraphs.

1. Supply voltage of the circuit $+V_{CC}$

The block 44 is entrusted with the monitoring of the supply voltage of the circuit. Upon the rise of the voltage $V_{CC}$, the output of the circuit remains blocked and no positive current can arrive at the base of the switching transistor as long as $V_{CC}$ is lower than 6.25 V.

At the moment of the unblocking, when $V_{CC}$ is higher than 6.25 V, the oscillator of the block 41 is already well stabilized and possibly synchronized (24, FIG. 2) and the watching processor is capable of operating.

Owing to the hysteresis of the comparator, about 0.5 V, it is when $V_{CC}$ redescends below 5.75 V that the base control is interrupted.

2. Time bases

By convention, there will be regrouped under this term the various signals and data processed by the blocks 41 and 42 and transmitted to the watching processor.

The block 41 comprises in particular a phase-locked loop oscillator, currently termed PLL, and a double pulse width modulator.

The oscillator, which delivers the sawtooth voltage shown in FIG. 3a, may be directly synchronized during 30% of the return time, at the end of the sawtooth. The return time of a sawtooth is equal to 7.5/100 of the period.

Figure 5:
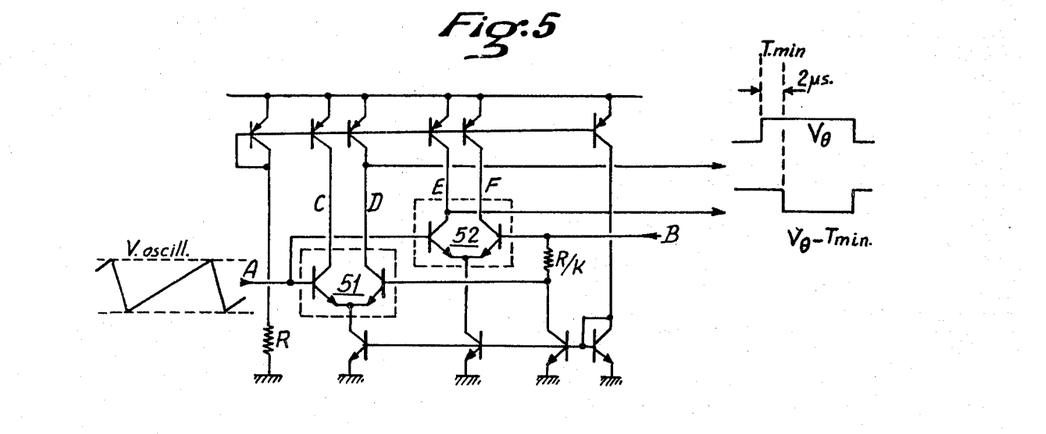
FIG. 5 represents the electric diagram of the double width modulator permitting obtaining the minimum conduction time following the start of the pulse at some instant.

The double pulse width modulator is shown in detail in FIG. 5. It comprises two comparators 51 and 52 each of which receives simultaneously at an input A the same sawtooth voltage from the oscillator. The other two inputs are controlled with a constant phase shift, due to the resistors R and R/k, by the output voltage of the regulation amplifier of the block 42 applied to the input B.

Selected from among the four signals available at the terminals C, D, E, F of the two comparators, there are sent to the logic block 47 a base control signal $V_\theta$ (leading edge variable with respect to time, fixed and synchronous trailing edge issuing from the terminal D) and a signal delayed for two µs: $V_\theta - T_{min} = V_\theta - 2$ µs issuing from the terminal E. 2 µs is the minimum duration $T_{min}$ of a pulse. Indeed, it is important that the switching transistor 21 (FIG. 2) remain conductive a sufficient time to enable the capacitor of the protection network RCD 25 (FIG. 2) to be completely discharged so that no voltage remains at its terminals at the moment of the cut-off.

If this time is reduced to zero, there is a danger that the transistor have the residual voltage of the capacitor at its terminals during the cut-off.

The block 41 also receives two voltages $V_{Tmin}$ and $V_{Tmax}$ which respectively correspond to the top and bottom comparison levels of FIG. 3a: indeed, there corresponds to a high voltage (maximum comparison level) the minimum conduction time on the sawtooth, consequently this voltage is referred to as $V_{Tmin}$. Inversely, $V_{Tmax}$ corresponds to the duration of maximum conduction and therefore to a minimum comparison level.

The block 41 also delivers a logic signal which appears when the output voltage of the regulation amplifier exceeds the top of the sawtooth and makes the comparator operate beyond the linear operating range. As mentioned before, this logic signal is considered as a defect and stops the control current as long as the comparator has not returned to the linear zone, while conforming to the minimum conduction time (2 µs), ensuring the operation or "standby".

Assembled in the block 42 are a reference voltage generator which is temperature compensated (V/Réf. 2.4. V) and a regulation differential amplifier.

The positive and negative inputs of the differential amplifier and the reference are accessible from outside the circuit. It is thus possible to invert them and make the regulation operate in the opposite direction (monitoring of the energy returned to the source). It is also possible to reduce the gain of the amplifier externally.

The regulated voltage is taken off, through a resistor, from the load after rectification and filtering of the secondary winding 26 (FIG. 2) and transmitted to the positive and negative input terminals of the differential amplifier through a photocoupler 201 (FIG. 2) for example or any other means separating potential of the mains supply.

The error voltage processed by the differential amplifier is compared in the block 41 between the minimum and maximum levels imposed for the good operation of the circuit.

To summarize, the part of the circuit which was conventionally termed "time base" sends to the matching processor 47 logic data coming from analog signals:
  a base control signal having steep leading edges $V_\theta$
  a signal whose leading edge is delayed for 2 µs: $V_\theta - Tmin$,
  a signal of the exceeding of the linear regulation zone,
  a signal corresponding to the return time of the sawtooth,
  an inhibition signal of 2 µs at the top of the sawtooth.

3. Monitoring of the primary current.

The block 45 monitors the current which passes through the primary winding 22 of the transformer, that is to say also that which passes through the switching transistor 21.

It contains a threshold amplifier which is symmetrical relative to earth temperature compensated and sensitive to positive and negative 0.2 V taken from the terminals of a weak resistor 29 (FIG. 2) connected in series with the emitter of the switching transistor. Depending on whether the common point is the emitter of the transistor or the negative pole of the power supply, the sawtooth signal at the terminals of the resistor is positive or negative. This is why the data input is sensitive in both directions.

The output of this block 45 delivers a logic level 1 as soon as the current reaches the maximum set or required absolute value.

4. Monitoring of the secondary current.

In addition to the data concerning the secondary voltage transmitted to the regulation amplifier 42 through a photo-coupler or any other means, the invention provides another secondary winding 27 (FIG. 2) one part of which ensures the supply $\pm V_{CCB}$ of the output stages of the circuit 23 whereby it is possible to have an output current of 4 amps and directly supply power to the base of the switching transistor, whereas another part of which secondary winding 27 sends to the block 46, through a resistor of high value, a voltage representing the current which passes through the secondary winding of the transformer, and in particular the utilization winding 26 which is isolated and brought to the zero reference voltage of the circuit.

The block 46 contains a comparator sensitive to +0.1 V and capable of accepting a negative voltage P.N.P. input.

This comparator supervises the secondary current: all the charge stored in the transformer during the primary current is evacuated by the secondary: the instant of the end of the secondary current is supervised which is manifested by the change of state of the voltage of the primary and, at this moment, the logic circuit 47 receives information without which the following period of the base current of the switching transistor could not occur.

This guarantees the safety of the switching transistor in the event of over current or of a short circuit of the secondary.

Therefore as long as the secondary 26 of the transformer supplies a current, the input voltage of the comparator of the block 46 delivers to the logic block 47 a logic information +1 which blocks the output.

The collector voltage transition from $V_m$ to $V_{CC}$ may sometimes have rebounds. Referring to the reference O, this means that the first passage O desired to be detected may be followed by one or two small pulses, but the latter are eliminated by the logic block which only takes into consideration the first passage to zero of the voltage of the secondary 26.

5. Standby and watching processor.

Provided in the block 47 is a watching processor which, at every instant, under the effect of any defect of operation, controls the interruption of the base current. Thus it guarantees the complete safety of the switching transistor.

Figure 6:
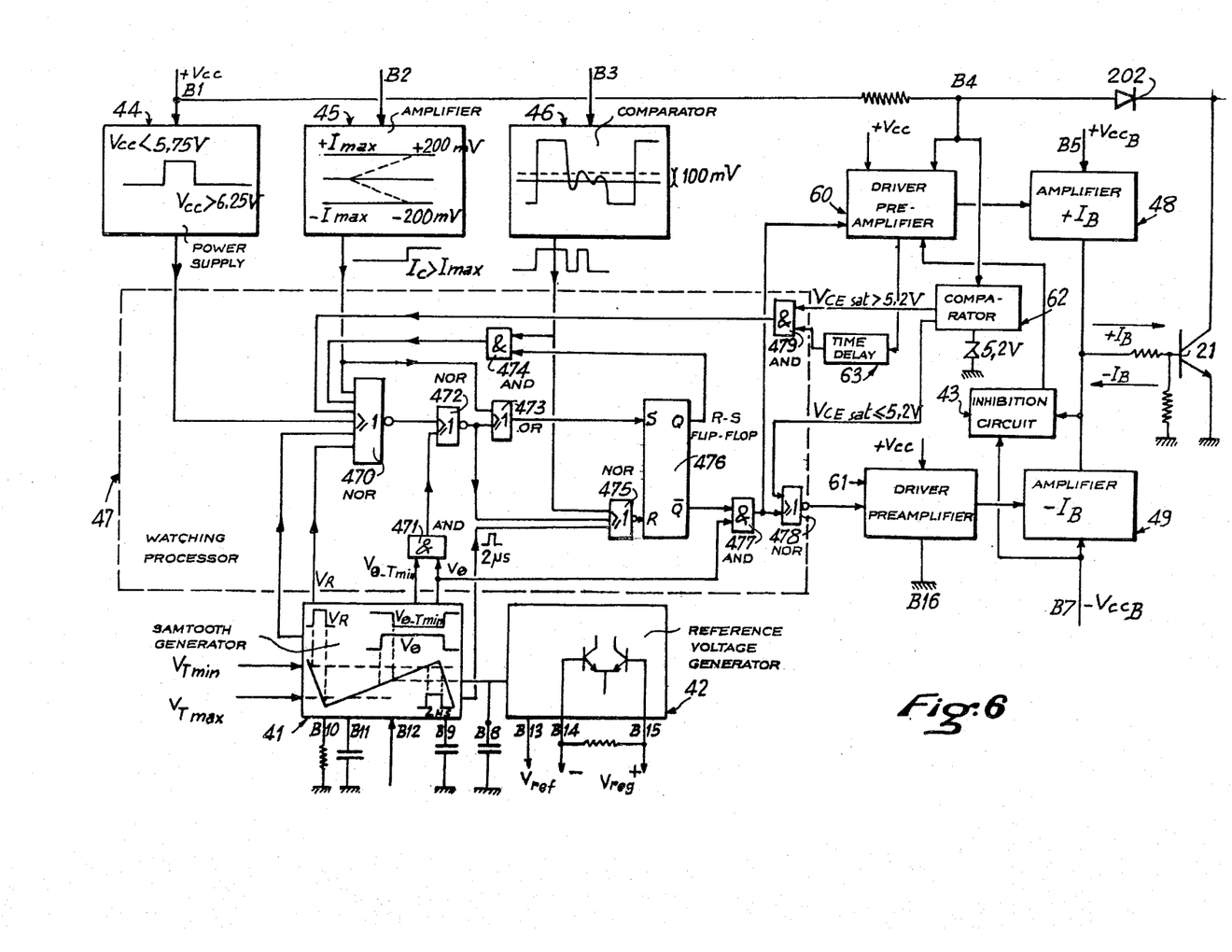
FIG. 6 represents, in the form of operational blocks a diagram which is more detailed than in FIG. 4 of the circuit according to the invention.

The operation of the watching processor 47 will be more easily understood with reference to FIG. 6 which gives, in the form of operational blocks, the complete diagram of the circuit according to the invention. However, FIG. 6 will be usefully studied in connection with FIG. 4 which is a simplified diagram of this circuit and with FIG. 2 which shows an example of the application of the circuit: the connection terminals B1 to B16 of the circuit 23 of FIG. 2 are repeated in FIG. 6.

The following points are important:

(a) The transistor will always receive a base current of a minimum duration of 2 μs throughout the extent of the regulating range.

(b) If a defect, for example a short circuiting of the load or an overloading of the latter, occurs during the first two microseconds of the condition, the base current will be interrupted only after these first 2 μs. As mentioned before, these two microseconds are required for discharging the capacitor of the RCD network 25 through the transistor. On the other hand, if the defect occurs after these 2 μs and until the collector current $I_C$ has reached its maximum value $I_{cmax}$, the cut-off of the base current is then instantaneous.

(c) At the end of each period of the collector current, the oscillator delivers a logic signal $V_R$ which behaves in the manner of a defect and always stops the base control at the same instant of the cycle. A memory stores all these data of defects present during the cycle (for example temporary overload . . . ) detected by the supervision of the current of the transistor or of the secondary current or by the regulation amplifier exceeding.

For each cycle, before a current can reach the base of the switching transistor, at the very moment of the appearance of the leading edge of the signal $V_\theta$ which must control this current, the watching processor checks that no defect prevents it.

The flip-flop entrusted with this operation can only change state if:

1. The secondary current is zero (information coming from block 46).

2. The primary current is lower than the set or required maximum collector current (information coming from block 45)

3. The regulation amplifier is in its linear regulation zone (minimum signal) (information coming from block 41).

If all these conditions are satisfied, the signal reaches the driver state which actuates the final stage 48 ($+I_B$).

The problems due to short circuits, operation under no load and the monitoring of the desaturation of the transistor are processed by the watching processor in the following manner:

(a) Short circuit of the secondary.

In the case of short circuit during the conduction time of the secondary, the voltage at the terminals of the latter does not exceed 0.8 V which is the direct voltage of the rectifing diode 203 (FIG. 2) with a current of about 6 A.

A long time, which may normally last several periods, is then required for evacuating through the secondary the magnetic energy accumulated in the transformer.

Throughout this time, the primary current remains blocked by the aperiodic monotoring of the secondary current by the block 42. Without this, practically the whole of the energy periodically supplied by the primary current would be added to that already stored and the transformer would rapidly reach saturation.

In the course of the supply of voltage, the transistor and the transformer operate at maximum load. The load circuit then acts as a short circuit of the secondary and consequently ensures the progressive starting up by charging the capacitor of the secondary filter by pulses of short duration at a very low conduction rate.

The switching transistor thus operates by intermittance and receives isolated base control pulses synchronous with the oscillator.

In practice, this signifies that, after a period of overload, during "n" periods of the oscillator, the circuit no longer delivers base current, while conforming to the minimum duration, until the logic processor once again authorizes a base current.

Thus it is clear that the circuit undertakes to limit the transfer of energy to a constant chosen value depending on the primary induction coil of the transformer.

(b) Operation with the secondary under no load.

In the case where no energy is taken from the secondary, the secondary voltage could reach a very high value if there were no electronic supervising circuits. In order to avoid this drawback, in most existing circuits, there is provided a supervision of the secondary voltage which cuts off the primary current when there is an overvoltage. But this type of control is uncertain owing to the separation of the mains since, when the secondary operates under no load, or with a minimum load, the regulation amplifier tends to reduce to zero the conduction time of the base and therefore also the duration of the collector current owing to the excess energy; that is to say, the time of passage of the current may then become very short and may even be cancelled out which makes the switching transistor operate under poorly defined conditions.

In the circuit according to the invention, this function of the monitoring of the secondary overvoltage is also performed by the watching processor 47.

At the end of the linear excursion of the regulation range at the precise moment when the duration of the control signal becomes equal to the minimum time, another comparator in the oscillator block 41 delivers a signal which behaves in the manner of a defect signal. The normal base control is then interrupted while conforming to the minimum duration (2 μs). It remains thus interrupted until the regulation amplifier returns to the authorized linear operating zone. The new base control is then well synchronous with the oscillator and always has a duration of at least 2 μs.

(c) Control of the desaturation of the transistor during conduction.

It is possible to introduce in the circuit through the exterior supply connection B4 of the driver of the amplifier $+I_B$ 48, a signal giving an information about the state of saturation of the switching transistor by connecting this point B4 to the collector of this transistor through a high tension diode 202 the direct voltage drop of which is $V_D$.

The voltage at the collector of the driver transistor during the conduction period is connected to the collector/emitter voltage of the switching transistor in the saturation condition and equal to:

$$V_{CE\,SAT} + V_D$$

If this voltage exceeds 6 V during the conduction, the logic block interrupts the base control while conforming to the minimum conduction time, since it receives a defect signal coming from the comparator 62 which compares the voltage of the switching transistor with a reference voltage 5,2 V.

(d) Control of the instantaneous amplitude of the base current.

Owing to this limitation of the collector voltage of the driver transistor which is connected to the saturation voltage of switching transistor through the high tension diode, directly during the conduction, the base of the switching transistor receives at each instant only the current which is just necessary to obtain this saturation voltage at the collector. The losses through the base are therefore reduced to a minimum and the base current increases as a function of the collector current which is of sawtooth form.

(e) Monitoring of the desaturation time of the collector before extraction of the carriers from the base.

After the end of the positive base current $+I_B$, it is necessary to wait until the start of the desaturation of the collector to enable the negative current $-I_B$ to start.

The comparator 62 detects this desaturation through the diode 202 and as soon as the corresponding logic signal appears, the current $-I_B$ is unblocked and allows the evacuation of the carriers from the base.

The monitoring of the start of the negative current enables the switching transistor to operate consequently under minimum conditions of cut-off time and switching losses.

(f) Simultaneous conduction.

These conditions of control of the operation of the switching transistor are completed by a circuit 43 for inhibiting simultaneous conduction which is adapted to prevent the final stages, namely stage 48 delivering a current $+I_B$ and the stage 49 absorbing a current $-I_B$, from conducting simultaneously at the start of the cycle. This inhibition circuit is completed by a time delay 63 which prevents the action of the saturation control at the start of the conduction cycle of $I_B$ during at least the entire duration of the simultaneous conduction inhibition. Otherwise a short defect corresponding to the inhibition time, would be sent to the logic at the very moment of the start of the base signal.

Logic circuit of the watching processor.

The watching processor comprises an NOR circuit 470 which receives as already mentioned, six defect data:

monitoring of the supply voltage (block 44)
monitoring of the primary current (block 45)
monitoring of the secondary current (clock 46)

These data reach the circuit 470 through an AND gate 474 and a NOR circuit 475 and an R-S flip-flop 476, the latter two ensuring the elimination of rebounds.

monitoring of the desaturation of the switching transistor during the conduction. It reaches the circuit 470 through the comparator 62 and an AND gate 479 introducing the data of the conduction time $V_\theta$.

monitoring of the end of each normal cycle of $+I_B$ (block 41)

monitoring of the limit of the linear zone of regulation (watching) (block 41)

An AND gate 471 introduces in the logic the data $V_\theta$ and $V_\theta - T_{min}$, determining the minimum conduction time irrespective of the phase of the start of conduction, coming from the block 41, to a NOR circuit 472, the latter receiving on its other input the output data of the sextuple NOR gate 470. If no defect is found, the signal from 472 is sent in parallel to an OR gate 473 which permanently monitors the over current of the primary current, and to a NOR circuit 475 which has three inputs and receives on its other two inputs, on one hand, an inhibition of 2 μs at the end of a cycle coming from the block 41, and, on the other hand, the data of inhibition during the duration of the secondary current coming from the block 46. The output of the OR gate 423 and the output of the NOR circuit 475 are respectively connected to the set and reset inputs of an R-S flip-flop 476. Therefore, for each period, the flip-flop checks, at the very moment of the start of the signal, $V_\theta$ that no defect is present in its memory. In this case, the output $\bar{Q}$ of the flip-flop and a signal $V_\theta$; directly issuing from the block 41, are sent to an AND gate 477 which authorizes the sending of a signal to the driver preamplifiers 60 and 61. The interruption of this signal by a defect cannot occur before a conduction duration of less than $\theta_{min}$.

The driver 60, which controls the current $+I_B$, is actuated directly by the AND gate 477. The driver 61, which controls the current $-I_B$, is actuated through a NOR circuit 478 which is monitored by the comparator 62 of the state of desaturation of the switching transistor 21.

The control circuit according to the invention has been described, in particular with reference to FIGS. 2, 4 and 6, as a circuit controlling a switching mode power supply. However, as already mentioned, it is suitable also for any other application such that data about the state of the current to be controlled and of the controlled current may be sent to the watching processor. The presence of a transformer is not essential and the data may come from other sensors.

The control of the line scanning in television is a type of application of this control circuit among other possible applications.

The circuit requires for its operation a few exterior components represented in particular in FIGS. 2 and 6. These components, which are neither identified nor described in the description, are a part of the art concerning the operation of devices such as oscillators, regulation amplifiers or comparators for example. However it should be mentioned that the circuit comprises only a few exterior components, in particular capacitors: these are components which cannot be integrated since the design of the circuit permits the integration thereof in a monolithic manner on a semi conductor crystal.

What is claimed is:

1. A power control circuit for controlling the base current to a switching transistor connected in series with a primary winding of a switching transformer comprising:
    first means for detecting the current flow through said transistor and producing a first signal when said current flow exceeds a first predetermined value;
    second means for detecting the current flow through a secondary winding of said transformer and producing a second signal when current flow through said second winding exceeds a second predetermined value;
    means for generating a sawtooth waveform and comparing said waveform to a reference voltage to produce a sequence of timing pulses;
    first amplifier means for supplying base current to said switching transistor;
    second amplifier means for absorbing base current from said switching transistor, said base current being cyclically supplied to and absorbed from said transistor;
    logic means connected to said first and second detecting means, said generating and comparing means and said first and second amplifier means for controlling supplying of base current to and absorbing current from said switching transistor in accordance with said pulses and said first and second signals.

2. A circuit as in claim 1, further including third means for detecting the supply voltage and producing a third signal when said supply voltage is less than a given value, said logic means controlling also in accordance with said third signal to prevent supplying current when said third signal is being produced.

3. A circuit as in claim 1 or 2 wherein said logic means blocks base current whenever one of said signals is produced.

4. A circuit as in claim 1 or 2 further including means for comparing the saturation voltage of said transistor with a reference voltage and producing a signal to cause said logic means to prevent supplying current when said saturation voltage is greater than said reference voltage.

5. A circuit as in claim 1, wherein said logic means includes a plurality of logic gates.

6. A circuit as in claim 1 or 2 wherein said logic means prevents supplying said base current and absorbing said base current when one of said signals is produced.

7. A circuit as in claim 1, wherein said generating and comparing means includes means for ensuring that each pulse has a duration at least equal to the discharge time of a capacitor through said switching transistor to protect said transistor.

8. A circuit as in claim 1, including comparator means connected to said voltage means for comparing the saturation voltage of said transistor with a reference voltage and a time delay circuit connected to said comparator means and logic means for preventing simultaneous conduction of said first and second amplifier means.

9. A circuit as in claim 1, wherein said means are all integrated in a monolithic circuit on a single semi-conductor crystal.

* * * * *